US011258363B2

(12) United States Patent
Kirchner et al.

(10) Patent No.: US 11,258,363 B2
(45) Date of Patent: Feb. 22, 2022

(54) SWITCHED MODE POWER SUPPLY CONTROL TOPOLOGY

(71) Applicant: TEXAS INSTRUMENTS INCORPORATED, Dallas, TX (US)

(72) Inventors: Joerg Kirchner, Mauern (DE); Stefan Dietrich, Freising (DE); Gaetano Maria Walter Petrina, Kirchdorf (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/712,498

(22) Filed: Dec. 12, 2019

(65) Prior Publication Data

US 2021/0184575 A1    Jun. 17, 2021

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0025* (2021.05); *H02M 1/0009* (2021.05); *H02M 1/08* (2013.01)

(58) Field of Classification Search
CPC .......................... H02M 3/1582; H02M 1/0025
See application file for complete search history.

(56) References Cited

U.S. PATENT DOCUMENTS

| | | | | |
|---|---|---|---|---|
| 7,768,245 B1* | 8/2010 | De Cremoux | ........ | H02M 3/156 323/259 |
| 8,248,046 B2 | 8/2012 | Hasegawa | | |
| 10,454,371 B1* | 10/2019 | Masini | ................ | H02M 3/1582 |
| 2013/0314062 A1* | 11/2013 | Notman | ............... | H02M 3/1588 323/271 |
| 2016/0111963 A1 | 4/2016 | Oyama | | |
| 2017/0257031 A1* | 9/2017 | Shao | .................... | H02M 3/1582 |
| 2021/0126539 A1* | 4/2021 | Couleur | ............. | H02M 3/1584 |

FOREIGN PATENT DOCUMENTS

JP    2014096962       5/2014
JP    2015076922 A     4/2015

OTHER PUBLICATIONS

PCT Search Report & Written Opinion dated Apr. 1, 2021.

* cited by examiner

*Primary Examiner* — Alex Torres-Rivera
(74) *Attorney, Agent, or Firm* — Valerie M. Davis; Charles A. Brill; Frank D Cimino

(57) ABSTRACT

Aspects of the disclosure provide for a circuit comprising a power converter controller. In an example, the power converter controller is configured to receive a signal representative of a current of a power converter, compare the signal representative of the current of the power converter to an error signal and generate a peak current detection signal having an asserted value when the signal representative of the current of the power converter is not less than the error signal. A state machine circuit is coupled the peak current detection circuit. The state machine circuit is configured to receive the peak current detection signal, a clock signal, and a timer signal and implement a state machine to generate at least one control signal for controlling a mode and a phase of operation of the power converter based on values of the peak current detection signal, the clock signal, and the timer signal.

21 Claims, 10 Drawing Sheets

SWITCHED MODE POWER SUPPLY
CONTROL TOPOLOGY

BACKGROUND

A switched mode power supply (SMPS) transfers power from an input power source to a load by switching one or more power transistors coupled through a switch node/terminal to an energy storage element (such as an inductor/transformer and/or capacitor), which is capable of coupling to the load. The power transistors can be included in a power converter that includes, or is capable of coupling to, the energy storage element. An SMPS can include an SMPS controller to provide one or more gate drive signals to the power transistor(s).

SUMMARY

At least some aspects of the present disclosure provide for a circuit. In at least some examples, the circuit includes a peak current detection circuit and a state machine circuit coupled to the peak current detection circuit. The peak current detection circuit is configured to receive an error signal, a feedback signal of a power converter, and a slope compensation signal and generate a peak current detection signal according to the error signal, the feedback signal of the power converter, and the slope compensation signal. The state machine circuit comprises a first state configured to generate a control signal for controlling a mode and a phase of operation of the power converter, receive the peak current detection signal, a clock signal, and a timer signal, determine that one of the peak current detection signal or the timer signal is asserted and the other of the peak current detection signal or the timer signal is de-asserted, and transition to another state of the state machine based on the determination. The state machine circuit further comprises the another state of the state machine. The another state of the state machine is configured to generate the control signal according to the another state of the state machine for further controlling the mode and the phase of operation of the power converter differently than in the first state.

Other aspects of the present disclosure provide for a circuit. In at least some examples, the circuit includes a power converter controller. The power converter controller includes a peak current detection circuit and a state machine circuit. The peak current detection circuit is coupled to the feedback circuit. The peak current detection circuit is configured to receive a signal representative of a current of a power converter. The peak current detection circuit is further configured to compare the signal representative of the current of the power converter to an error signal. The peak current detection circuit is further configured to generate a peak current detection signal having an asserted value when the signal representative of the current of the power converter is not less than the error signal. The state machine circuit is coupled to the peak current detection circuit. The state machine circuit is configured to receive the peak current detection signal, a clock signal, and a timer signal. The state machine circuit is further configured to implement a state machine to generate at least one control signal for controlling a mode and a phase of operation of the power converter based on values of the peak current detection signal, the clock signal, and the timer signal.

Other aspects of the present disclosure provide for a system. In at least some examples, the system includes a switched mode power supply (SMPS). The SMPS includes a power converter, a SMPS controller, and a gate driver. The power converter includes a plurality of transistors each configured to receive a unique one of a plurality of gate control signals. The SMPS controller includes a feedback circuit, a peak current detection circuit, and a state machine circuit. The feedback circuit has an input terminal coupled to the power converter and an output terminal. The peak current detection circuit has a first input terminal coupled to the power converter, a second input terminal coupled to the output terminal of the feedback circuit, and an output terminal. The state machine circuit has an input terminal coupled to the output terminal of the gate determination circuit and an output terminal. The state machine circuit is configured to receive a peak current detection signal, a clock signal, and a timer signal and implement a state machine to generate control signals for controlling a mode and a phase of operation of the power converter based on values of the peak current detection signal, the clock signal, and the timer signal. The gate driver has an input terminal coupled to the output terminal of the state machine circuit and an output terminal coupled to one of the plurality of transistors.

BRIEF DESCRIPTION OF THE DRAWINGS

For a detailed description of various examples, reference will now be made to the accompanying drawings in which.

DETAILED DESCRIPTION

Figure 1:
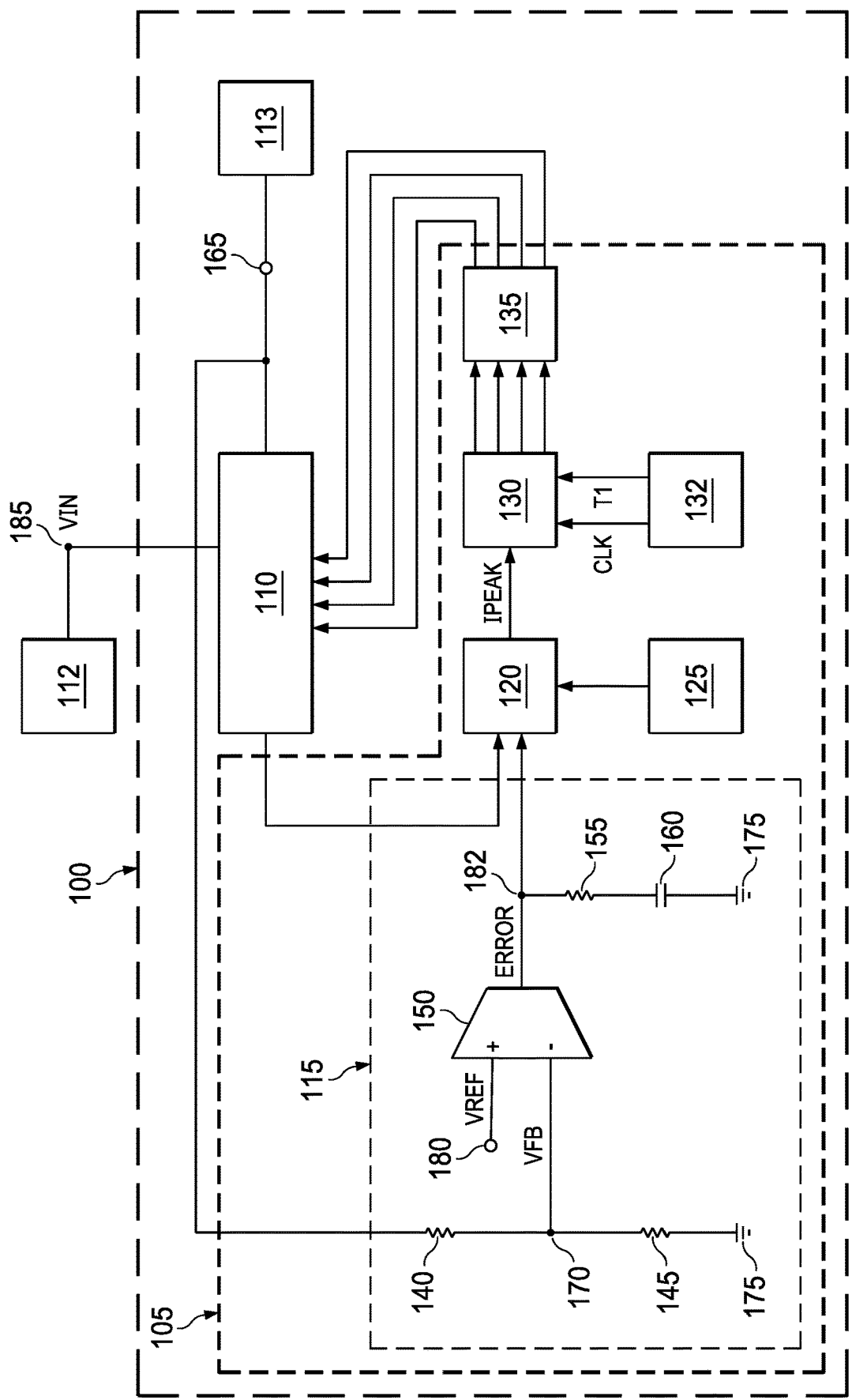
FIG. 1 shows a block diagram of an illustrative switched mode power supply in accordance with various examples.

In some architectures (such as buck-boost), a switched mode power supply (SMPS) includes, or is capable of coupling to, an output/bulk capacitor in parallel with the load. A SMPS controller switches the power transistor(s) to form circuit arrangements with the energy storage element(s) to supply a load current to the load and/or to the output/bulk capacitor to maintain a regulated output voltage (e.g., by filtering the switched load current). For example, a power transistor can be coupled through the switch node/terminal to an energy storage inductor. The energy storage inductor is switched by the SMPS controller between charge and discharge cycles to supply inductor current (e.g., current through the energy storage inductor) to the load and to the output/bulk capacitor to filter the inductor current to maintain the regulated output voltage. In some examples, an SMPS can be configured for operation as a constant current source with an energy storage element but with no output/bulk capacitor.

The power transistors can be implemented as metal oxide semiconductor field effect transistors (MOSFETs) or any other suitable solid-state transistor devices (e.g., such as bi-polar junction transistors (BJTs)). As an input voltage (VIN), or an output voltage (VOUT), of the power converter varies, the SMPS controller may control the power converter to operate in difference modes of operation. For example, when VIN is greater than VOUT, the SMPS controller may control the power converter to operate in a buck mode of operation. When VIN is less than VOUT, the SMPS controller may control the power converter to operate in a boost mode of operation. When VIN is approximately equal to VOUT, the SMPS controller may control the power converter to operate in a buck-boost mode of operation. To control a mode of operation of the power converter, the SMPS controller provides gate control signals to one or more power transistors of the power converter. A value of each of these gate control signals determines whether a respective power transistor receiving the gate control signal is in a conductive state (e.g., turned on) or in a non-conductive state (e.g., turned off). To change a mode of operation of the power converter, the SMPS controller modifies a value of one or more of the gate control signals to turn one or more of the power transistors on or off. Additionally, while remaining in a mode of operation of the power converter, the SMPS controller may modify a value of one or more of the gate control signals, for example, to alternatively turn on and turn off one or more power transistors.

When a change in the switching scheme of the power converter occurs, a glitch or other potentially undesirable variation in VOUT may occur. The switching scheme is the particular timing and values provided by the SMPS controller for the gate control signals while operating in, or transitioning between, modes of operation. In some implementations, VOUT may experience a sudden drop in value and/or a sudden spike in value when a change in switching scheme occurs. For example, when changing between a buck mode of operation to a buck-boost mode of operation or between the buck-boost mode of operation and a boost mode of operation, a glitch or other potentially undesirable variation in VOUT may occur. In some circuit architectures this glitch may be undesirable, for example, such that it causes unintended or undesirable actions to occur. For example, a sudden drop or spike in VOUT can, in some circuits, cause the circuit to reset and power cycle as a protective measure. Accordingly, at least some customers may place a premium on importance of VOUT having a substantially smooth profile at transition points for modes of operation such that minimal variation in VOUT occurs. At least some examples of the present disclosure may provide for a variation of about +/−1% of VOUT. Other examples of the present disclosure may provide for smaller variations, such as about +/−0.75% of VOUT, +/−0.5% of VOUT, +/−0.25% of VOUT, or less.

At least some aspects of the present disclosure relate to a controller suitable for controlling a power converter, such as in a SMPS. In at least one example, the controller includes elements suitable for implementing a transition between modes of operation that does not disturb a smooth profile of VOUT at the transition point. Such a transition is subsequently referred to herein as a smooth transition. To implement the smooth transition, the controller implements a state machine that controls values and timing of the gate control signals. The state machine, in at least some implementations, monitors a peak current value (IPEAK) associated with the power converter, a timer value or signal (T1), and a value of a clock signal (CLK). Based on values of one or more of these monitored variables at a given point in time, the state machine outputs one or more control signals to control generation of gate control signals. For example, based on when IPEAK is reached in reference to at least one of T1 or CLK, the state machine controls generation of the gate control signals to cause the power converter to remain in a mode of operation or transition between modes of operation. The state machine's generation of the gate control signals based on the teachings of the present disclosure, in at least some examples, prevents extreme shifts in duty cycle of the power converter when transitioning between modes of operation. By preventing these extreme shifts, extreme shifts in IPEAK when transitioning between modes of operation are also avoided and the smooth profile of VOUT at the transition point is achieved.

Turning now to FIG. 1, a block diagram of an illustrative SMPS 100 is shown. In at least one example, the SMPS 100 includes a controller 105 and a power converter 110. The SMPS 100, at least through the power converter 110, switches power from a node 185, provided by a power source 112, to a load 113. The power converter 110 is, for example, a buck-boost power converter that is capable of operating according to a buck mode of operation, a boost mode of operation, and a buck-boost mode of operation. In at least one example, the controller 105 includes, or is configured to couple to, a feedback circuit 115, a peak current detection circuit 120, a slope compensation circuit 125, a circuit 130, an oscillator 132, and a gate driver 135. At least one example of the SMPS 100 includes at least some aspects of the controller 105 and the power converter 110 on a same semiconductor die and/or in a same component package, while in other examples the controller 105 and the power converter 110 may be fabricated separately and configured to couple together. For example, at least some aspects of the controller 105 may be fabricated separately and coupled together. Accordingly, while illustrated as including the gate driver 135, in at least one example the controller 105 does not include the gate driver 135 and instead is configured to couple to the gate driver 135. In at least some examples, the circuit 130 is any component or combination of components capable of performing processing to generate one or more output signals based on one or more input signals. In at least some implementations the circuit 130 is a state machine circuit. In some examples, the circuit 130 is an analog circuit configured to implement a state machine. In other examples, the circuit 130 is a digital circuit configured to implement a state machine. In yet other examples, the circuit 130 is a hybrid analog and digital circuit configured to implement a state machine. Based on values of one or more input signals to the circuit 130, the state machine generates one or more control signals for controlling the power converter 110, for example, via the gate driver 135. In at least one example, the gate driver 135 includes a plurality of inverters, where each inverter is uniquely coupled between one output terminal of the circuit 130 and a gate terminal of a transistor of the power converter 110.

In at least one example, the feedback circuit 115 includes a resistor 140 coupled between a node 165 and a node 170 and a resistor 145 coupled between the node 170 and a ground node 175. The feedback circuit 115 further includes an amplifier 150 having a first input terminal (e.g., a non-inverting input terminal) coupled to a node 180 and configured to receive a reference voltage (VREF) at the node 180. The amplifier 150 further has a second input terminal (e.g., an inverting input terminal) coupled to the node 170, and an output terminal coupled to a node 182. A feedback signal (VFB) is present at the node 170 and is a scaled representation of VOUT. A resistor 155 is coupled between the node 182 and a top plate of a capacitor 160 and a bottom plate of the capacitor 160 is coupled to the ground node 175.

The peak current detection circuit 120 has a first input terminal coupled to the power converter 110 (e.g., coupled to a high-side power transistor (not shown) of the power converter 110) and a second input terminal coupled to the node 182. The peak current detection circuit 120 further has a third input terminal coupled to an output terminal of the slope compensation circuit 125 and an output terminal coupled to a first input terminal of the circuit 130. In at least one implementation, the circuit 130 receives IPEAK from the peak current detection circuit 120. The circuit 130 further has a second input terminal coupled to the oscillator 132, a third input terminal coupled to the oscillator 132, and a fourth input terminal coupled to the oscillator 132. In at least one implementation, the circuit 130 receives CLK and T1 from the oscillator 132. In at least one example, the circuit 130 has a number of output terminals at least equal to a number of power transistors of the power converter 110, with each of those output terminals coupled to a respective and corresponding input terminal of the gate driver 135. The gate driver 135 in turn has a number of output terminals at least equal to a number of power transistors (not shown) of the power converter 110, where each output terminal of the gate driver 135 is uniquely coupled to a gate terminal of one of the power transistors of the power converter 110.

In at least one example, the SMPS 100 is configured to receive VIN from the power source 112 and provide VOUT at the node 165 for supplying the load 113. VOUT is based at least partially on VIN and VREF received by the SMPS 100 at the node 180. VREF may be received from any suitable device (not shown) such as a processor, microcontroller, or any other device exerting control over the SMPS 100 to control a value of VOUT. In at least one example, VREF has a value representative of a desired (e.g., user-desired, target, preconfigured, programmed, etc.) value of VFB. Accordingly, in at least some implementations, the controller 105 receives one or more signals from the power converter 110. For example, the controller 105 may receive VOUT from the power converter 110 and/or a value representative of an inductor current (IL) of the power converter 110. In various examples, the value representative of IL may be a value directly measured from an inductor (not shown) of the power converter 110 (or a terminal of another component of the power converter 110 to which the inductor is also coupled) or a value sensed from a sense element (not shown) of the power converter 110. The sense element is, for example, a sense resistor, a transistor, or any other component or combination of components capable of measuring IL of the power converter 110 and providing the value representative of IL to the controller 105. In at least one example, the value representative of IL is provided to the peak current detection circuit 120 and VOUT is provided to the feedback circuit 115.

In at least one example, the feedback circuit 115 is configured to receive VREF and VOUT and generate an error signal indicating a variation in VREF from VFB. In at least some examples, VFB is an output of a voltage divider formed of the resistor 140 and the resistor 145, where an input to the voltage divider is VOUT. In at least some examples, the amplifier 150 is a transconductance amplifier, where a current value output by the amplifier 150 is an error signal (ERROR) indicates the variation in VREF from VFB. ERROR is subsequently filtered by the resistor 155 and capacitor 160 before being received by the peak current detection circuit 120.

The peak current detection circuit 120 receives the signal representative of IL and the error signal and compares the signal representative of IL to the error signal. When the signal representative of IL rises in value to reach the error signal (e.g., in a peak-current system), the peak current detection circuit 120 outputs an asserted signal indicating that a peak detection has been made. In at least one example, that asserted signal is IPEAK having an asserted value, such as having a logical high value. In other examples, such as a valley current system, when the signal representative of IL falls in value to reach the error signal, the peak current detection circuit 120 outputs an asserted signal indicating a valley detection has been made. In at least some examples, the peak current detection circuit 120 resets IPEAK to a de-asserted value based on a control signal generated when IPEAK is asserted. For example, when IPEAK becomes asserted, a gate control signal for a high-side transistor of the power converter 110 is de-asserted and a gate control signal for a low-side transistor of the power converter 110 is asserted. IPEAK may be reset by the peak detection circuit 120, in various examples, based on a rising edge, or a falling edge, of either of these gate control signals.

In some examples, prior to comparing the signal representative of IL to the error signal, the peak current detection circuit 120 performs slope compensation. For example, the peak current detection circuit 120 receives a slope compensation signal from the slope compensation circuit 125. In at least one example, the slope compensation circuit 125 generates the slope compensation signal by charging a capacitor (not shown) with a current proportional to at least one of VIN or VOUT, where a voltage at a top plate of the capacitor is the slope compensation signal. Prior to the comparison, the peak current detection circuit 120 adds the slope compensation signal to the signal representative of IL or subtracts the slope compensation signal from the error signal. Accordingly, in at least some examples the peak current detection circuit 120 includes an adder (not shown) configured to add the slope compensation signal to the signal representative of IL or subtract the slope compensation signal from the error signal. In some examples, the peak current detection circuit 120 further includes a comparator (not shown) configured to compare an output of the adder to one of the signal representative of IL or the error signal. For example, when the adder adds the slope compensation signal to the signal representative of IL, the comparator compares an output of the adder to the error signal to generate IPEAK. When the adder subtracts the slope compensation signal from the error signal, the comparator compares the signal representative of IL to the output of the adder to generate IPEAK. The slope compensation signal is generated by the slope compensation circuit 125, based at least partially on IL and/or VOUT, according to any suitable scheme, process, or architecture, the scope of which is not limited herein. The slope compensation signal provides stability, in some examples, in the SMPS 100 when the SMPS 100 is operating at a constant frequency and duty cycle greater than about 50%. The peak current detection circuit 120 subsequently outputs IPEAK to the circuit 130.

The circuit 130 receives IPEAK, CLK, and T1, and based on values of IPEAK, CLK, and T1 with respect to states of the circuit 130, generates one or more signals for controlling the gate driver 135. For example, T1 has a value that is a percentage of a period of CLK such that after a rising edge in CLK, T1 is reached before another rising edge occurs in CLK. In at least some examples, T1 is reset at each rising edge of CLK. When the power converter 110 is operating in the buck mode of operation, the circuit 130 outputs control signals to the gate driver 135 to cause the power converter 110 to remain in the buck mode of operation when IPEAK is asserted prior to T1 being reached. When operating in the buck mode of operation and IPEAK is asserted after T1 is reached, the circuit 130 outputs control signals to the gate driver 135 to cause the power converter 110 to transition to a buck-boost mode of operation. When the power converter 110 is operating in the buck-boost mode of operation, the circuit 130 outputs control signals to the gate driver 135 to cause the power converter 110 to remain in the buck-boost mode of operation when IPEAK is asserted prior to a rising edge in CLK. When operating in the buck-boost mode of operation and IPEAK is reached after a rising edge in CLK, the circuit 130 outputs control signals to the gate driver 135 to cause the power converter 110 to transition to a boost mode of operation.

When the power converter 110 is operating in the boost mode of operation, the circuit 130 outputs control signals to the gate driver 135 to cause the power converter 110 to remain in the boost mode of operation when IPEAK is asserted after T1 is reached. When operating in the boost mode of operation and IPEAK is asserted prior to T1 being reached, the circuit 130 outputs control signals to the gate driver 135 to cause the power converter 110 to transition to a buck-boost mode of operation. When the power converter 110 is operating in the buck-boost mode of operation, the circuit 130 outputs control signals to the gate driver 135 to cause the power converter 110 to remain in the buck-boost mode of operation when IPEAK is asserted after a rising edge in T1 and prior to a rising edge in CLK. When operating in the buck-boost mode of operation and IPEAK is asserted prior to a rising edge in T1, the circuit 130 outputs control signals to the gate driver 135 to cause the power converter 110 to transition to a buck mode of operation.

In at least some examples, the oscillator 132 is any circuit or circuits capable of generating and/or outputting CLK having a constant frequency and generating T1. In at least one example, T1 is generated by a resistor-capacitor (RC) timer circuit that is cleared or reset at each rising edge of CLK.

Based on the control signals received from the circuit 130, the gate driver 135 generates gate control signals for controlling power transistors of the power converter 110, as discussed above. For example, the gate driver 135 generates gate control signals that alternatingly, and selectively, turn the power transistors of the power converter on and off to energize and de-energize elements such as an inductor and/or a capacitor. This energizing and de-energizing provides the buck, boost, and/or buck-boost functionality discussed herein. The gate driver 135 is implemented according to any suitable architecture, the scope of which is not limited herein.

Figure 2:
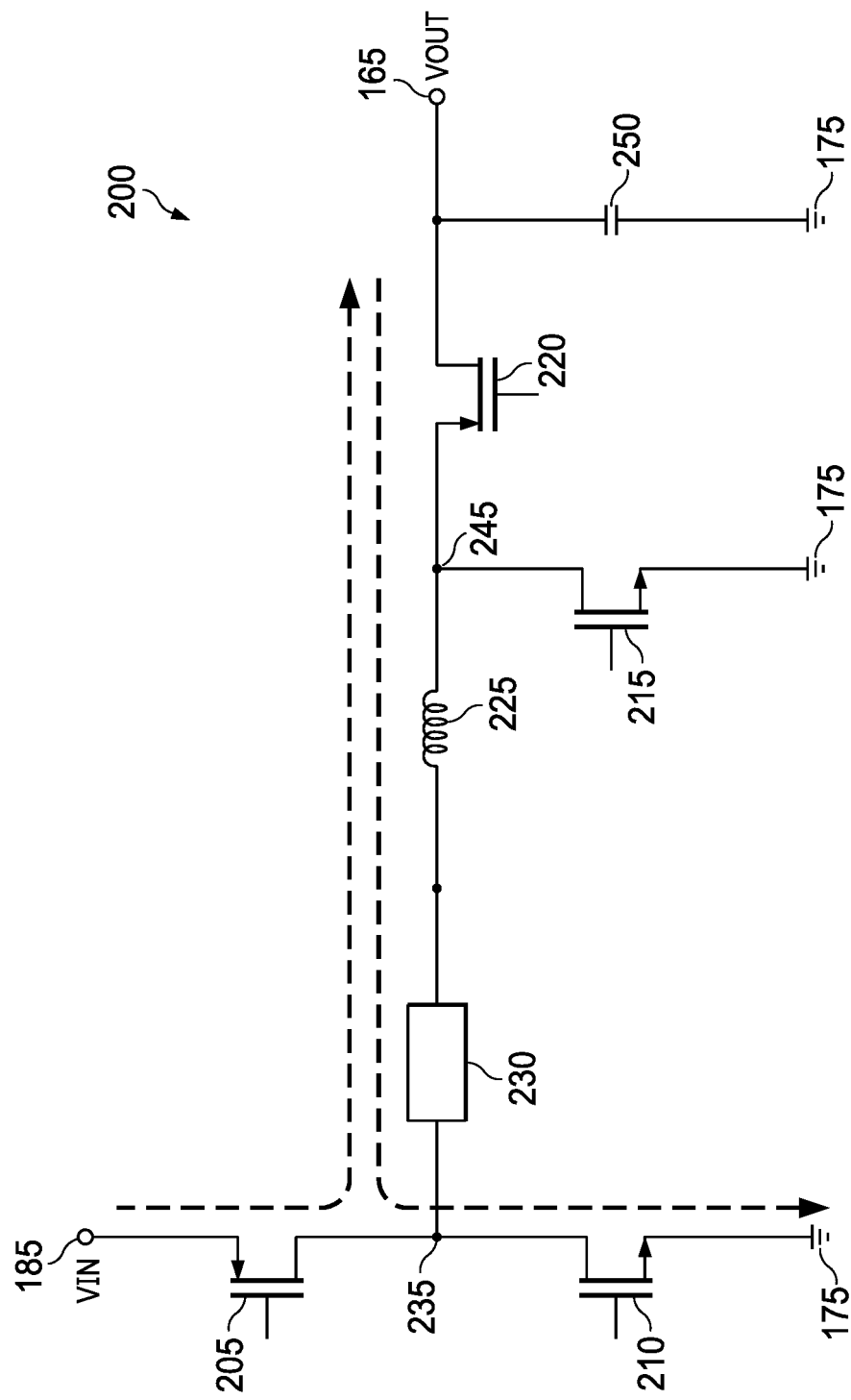
FIG. 2 shows a schematic diagram of an illustrative buck-boost power converter in accordance with various examples.

Turning now to FIG. 2, a schematic diagram of an illustrative buck-boost power converter 200 is shown. In at least one example, the buck-boost power converter 200 is suitable for implementation as the power converter 110 of the SMPS 100 of FIG. 1, discussed above. Accordingly, reference is made to at least some components or signals of FIG. 1 in describing FIG. 2. FIG. 2 illustrates the buck-boost power converter 200 during the buck mode of operation, which in at least some examples includes a buck energize phase and a buck de-energize phase.

In one example, the buck-boost power converter 200 includes a plurality of metal oxide semiconductor field effect transistors (MOSFETs) 205, 210, 215, and 220, and at least one energy storage device (illustrated in this example as an inductor 225). In another example, the buck-boost power converter 200 further includes a second inductor (not shown) and/or a fly-capacitor (not shown). In one example, the MOSFETs 205 and 220 are implemented as p-type MOSFETs (PMOS) and the MOSFETs 210 and 215 are implemented as n-type MOSFETs (NMOS). In at least one example, the buck-boost power converter 200 further includes a sense element 230 suitable for sensing IL of the inductor 225 and generating the signal representative of IL. The sense element 230 is, for example, a MOSFET, a resistor, or any other suitable circuit capable of, or having a means of, sensing, measuring, or detecting IL. In at least one example, the sense element 230 is implemented by one of the MOSFETs 205, 210, 215, or 220 such that the sense element 230 is not an independent, additional component of the buck-boost power converter 200.

In one example architecture, a source terminal of the MOSFET 205 is coupled to the node 185 and configured to receive VIN, a drain terminal of the MOSFET 205 is coupled to a node 235, and a gate terminal of the MOSFET 205 is coupled to a controller. The controller is, for example, the gate driver 135. A drain terminal of the MOSFET 210 is coupled to the node 235, a source terminal of the MOSFET 210 is coupled to a ground node 175, and a gate terminal of the MOSFET 210 is coupled to the controller. A first terminal of the inductor 225 is coupled to the node 235 and a second terminal of the inductor 225 is coupled to a node 245. In at least one example, the sense element 230 is coupled in series between node 235 and the first terminal of the inductor 225. A drain terminal of the MOSFET 215 is coupled to the node 245, a source terminal of the MOSFET 215 is coupled to the ground node 175, and a gate terminal of the MOSFET 215 is coupled to the controller. A source terminal of the MOSFET 220 is coupled to the node 245, a drain terminal of the MOSFET 220 is coupled to the node 165 at which VOUT is present, and a gate terminal of the MOSFET 220 is coupled to the controller. In at least one example, the inductor 225 is implemented as an external component such that the buck-boost power converter 200 does not include the inductor 225 but is configured to couple to the inductor 225 between the node 235 and the node 245. In at least one example, the buck-boost power converter 200 is configured to couple to a capacitor 250 (e.g., such as a filtering capacitor) between the drain terminal of the MOSFET 220 and the ground node 175.

In one example, the MOSFETs 205, 210, 215, and/or 220 are controlled to turn on (e.g., conduct current between their respective drain terminals and source terminals) and/or turn off (e.g., cease conducting current between their respective drain terminals and source terminals) based on a signal received at their respective gate terminals. For example, based on a gate control signal received from the controller (e.g., as output by the gate driver 135 under control of the circuit 130), one or more of the MOSFETs 205, 210, 215, and/or 220 are controlled to turn on or turn off. The MOSFETs 205, 210, 215, and/or 220 may turn on (or off) based on a value, or relationship between values, present at one or more of their respective gate terminals and/or source terminals.

As further illustrated in FIG. 2, in at least one example the buck-boost power converter 200 is configured to operate in a buck mode of operation, including buck energize and buck de-energize phases. The buck energize and buck de-energize phases are illustrated in FIG. 2 by dashed lines terminating at one end with an arrow that indicates a direction of current flow in the buck-boost power converter 200 during that respective phase of the buck mode of operation.

During the buck energize phase, at each rising edge of CLK the MOSFETs 205 and 220 are controlled by the controller to be turned on and the MOSFETs 210 and 215 are controlled by the controller to be turned off. In this configuration, current flows from the node 185 to the inductor 225 to charge the inductor until a value of the signal representative of IL reaches a value of the error signal and IPEAK is asserted. When IPEAK is asserted the buck-boost power converter 200 enters the buck de-energize phase. In the buck de-energize phase, MOSFETs 210 and 220 are controlled by the controller to be turned on and the MOSFETs 205 and 215 are controlled by the controller to be turned off. In this configuration, current discharges from the inductor until another rising edge of CLK is received and the buck-boost power converter 200 returns to the buck energize phase.

Figure 3:
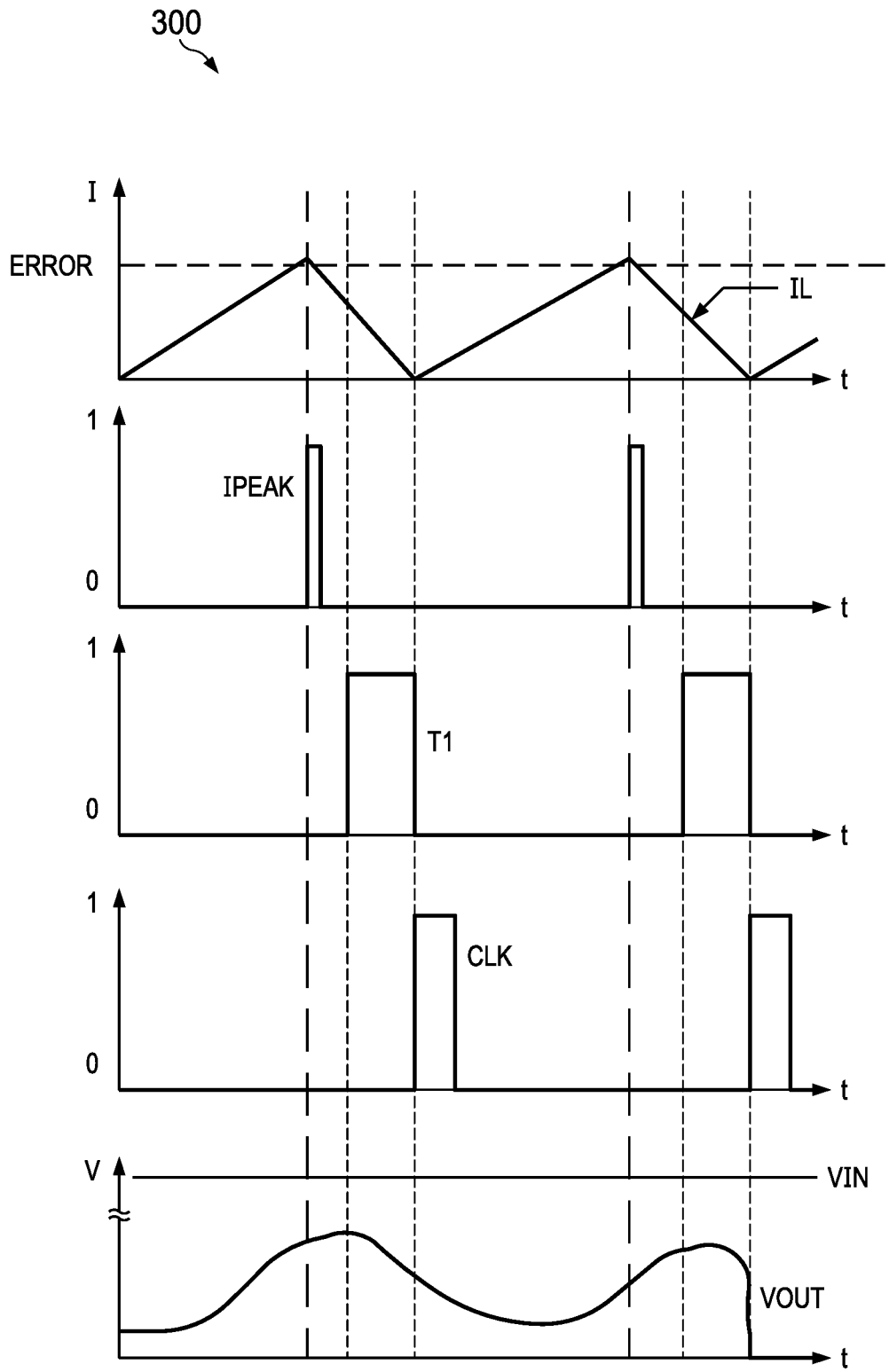
FIG. 3 shows an illustrative diagram of illustrative waveforms in a buck mode of operation of a power converter in accordance with various examples.

Turning now to FIG. 3, a diagram 300 of illustrative waveforms in a buck mode of operation of a power converter is shown. In at least some examples, the diagram 300 is illustrative of at least some signals present in the SMPS 100 of FIG. 1 and/or the buck-boost power converter 200 of FIG. 2. For example, the diagram 300 illustrates signals present in the SMPS 100 of FIG. 1 and/or the buck-boost power converter 200 of FIG. 2 while operating in a buck mode of operation. Accordingly, reference is made to at least some components or signals of FIG. 1 and/or FIG. 2 in describing FIG. 3. Furthermore, the signals illustrated in the diagram 300 are illustrated in an ideal sense, omitting representation of noise and/or signal ripple for the sake of clarity of explanation and ease of understanding.

Diagram 300 illustrates two cycles of operation of the buck-boost power converter 200, beginning with a buck energize phase. When the buck energize phase begins, IL begins to increase in value. At each rising edge of CLK, a new buck energize phase begins. When IL (or the signal representative of IL) increases in value to reach a value of ERROR, IPEAK is asserted. When IPEAK is asserted, the buck de-energize phase begins and IL decreases in value until a next rising edge of CLK occurs. As further shown in FIG. 3, while operating, and being controlled to remain, in the buck mode of operation, IPEAK is asserted prior to T1 being asserted (e.g., a T1 timer expiring). In at least some examples, T1 becomes asserted at a time corresponding to approximately 90% of the period of operation of the buck-boost power converter 200. While VIN is shown in the diagram 300 as having a substantially stable and constant value greater than VOUT, in at least some examples, as VIN decreases in value, a duty cycle of the buck-boost power converter 200 (e.g., a duration of the buck energize phase) increases. When the duty cycle increases sufficiently to cause IPEAK to not be asserted prior to T1 being asserted, the buck-boost power converter 200 is controlled to transition to the buck-boost mode of operation.

Figure 4:
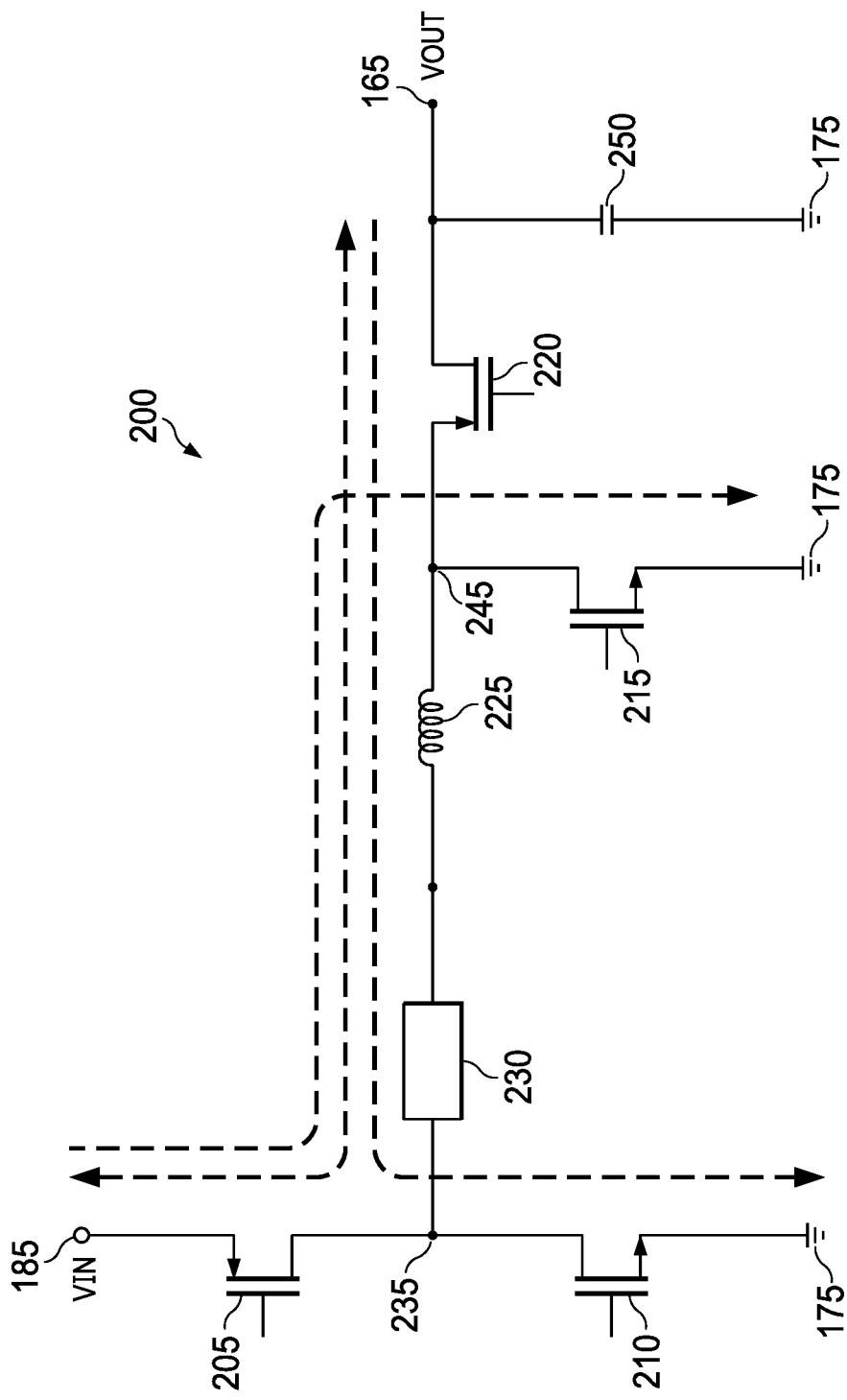
FIG. 4 shows a schematic diagram of an illustrative buck-boost power converter in accordance with various examples.

Turning now to FIG. 4, another schematic diagram of the illustrative buck-boost power converter 200 is shown. FIG. 4 illustrates the buck-boost power converter 200 during the buck-boost mode of operation. FIG. 4 also illustrates the buck-boost power converter 200 during transitions to, or from, operation in the buck-boost mode of operation. To remain in the buck mode of operation as discussed above with respect to FIG. 2 and FIG. 3, IPEAK is asserted prior to T1 being asserted. However, when IPEAK is asserted after T1 is asserted, the controller controls the power converter 110 to transition to the buck-boost mode of operation. The buck-boost mode of operation, including transitions to and from, includes buck energize, buck de-energize, and boost energize phases. The buck energize, buck de-energize, and boost energize phases are illustrated in FIG. 4 by dashed lines terminating at one end with an arrow that indicates a direction of current flow in the buck-boost power converter 200 during that respective phase of the buck-boost mode of operation.

During the buck energize phase, at each rising edge of CLK the MOSFETs 205 and 220 are controlled by the controller to be turned on and the MOSFETs 210 and 215 are controlled by the controller to be turned off. In this configuration, current flows from the node 185 to the inductor 225 to charge the inductor until a value of the signal representative of IL reaches a value of the error signal and IPEAK is asserted. However, when IPEAK is not asserted prior to T1 being asserted, at T1 the MOSFETs 205 and 215 are controlled by the controller to be turned on and the MOSFETs 210 and 220 are controlled by the controller to be turned off. In this configuration, current continues to flow from the node 185 to the inductor 225 to continue charging the inductor until a value of the signal representative of IL reaches the value of the error signal and IPEAK is asserted. When IPEAK is asserted the buck-boost power converter 200 enters the buck de-energize phase. In the buck de-energize phase, MOSFETs 210 and 220 are controlled by the controller to be turned on and the MOSFETs 205 and 215 are controlled by the controller to be turned off. In this configuration, current discharges from the inductor until another rising edge of CLK is received.

Figure 5:
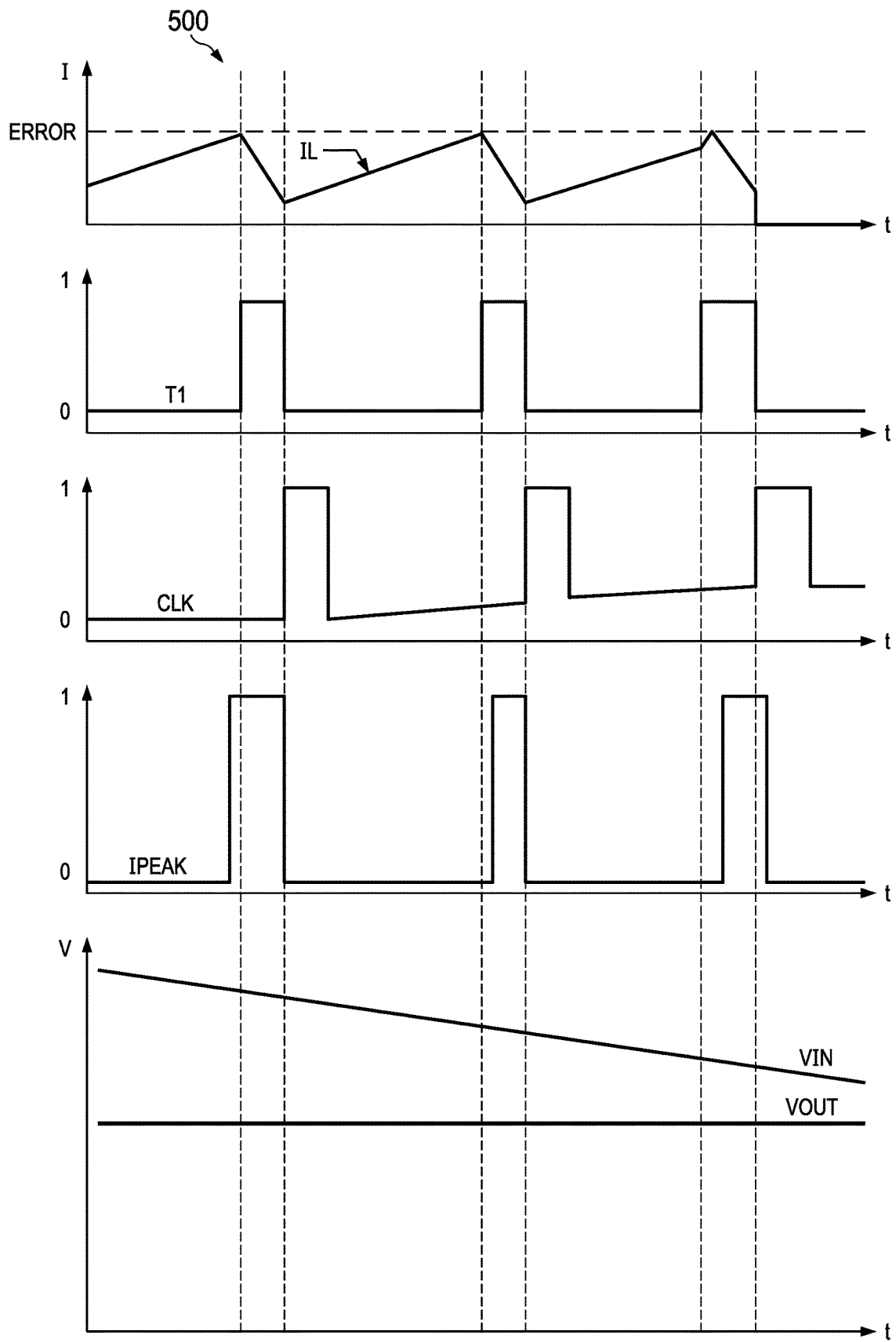
FIG. 5 shows an illustrative diagram of illustrative waveforms in a buck-boost mode of operation of a power converter in accordance with various examples.

Turning now to FIG. 5, a diagram 500 of illustrative waveforms in a buck-boost mode of operation of a power converter is shown. In at least some examples, the diagram 500 is illustrative of at least some signals present in the SMPS 100 of FIG. 1 and/or the buck-boost power converter 200 of FIG. 4. For example, the diagram 500 illustrates signals present in the SMPS 100 of FIG. 1 and/or the buck-boost power converter 200 of FIG. 4 while transitioning from a buck mode of operation to a buck-boost mode of operation. Accordingly, reference is made to at least some components or signals of FIG. 1 and/or FIG. 4 in describing FIG. 5. Furthermore, the signals illustrated in the diagram 500 are illustrated in an ideal sense, omitting representation of noise and/or signal ripple for the sake of clarity of explanation and ease of understanding.

Diagram 500 illustrates three cycles of operation of the buck-boost power converter 200 when transitioning from the buck mode of operation to the buck-boost mode of operation. When the buck energize phase begins, IL begins to increase in value. At each rising edge of CLK, a new buck energize phase begins. When T1 is asserted and IPEAK is de-asserted, the boost energize phase begins and IL increases in value more rapidly. When IL (or the signal representative of IL) increases in value to reach a value of ERROR, IPEAK is asserted. When IPEAK is asserted, the buck de-energize phase begins and IL decreases in value until a next rising edge of CLK occurs. As further shown in FIG. 5, while operating, and being controlled to remain, in the buck-boost mode of operation, IPEAK is asserted prior to T1 being asserted (e.g., a T1 timer expiring). In at least some examples, T1 becomes asserted at a time corresponding to approximately 90% of the period of operation of the buck-boost power converter 200 prior to the first boost energize phase occurring. After the first boost energize phase occurs, in at least some examples T1 becomes asserted at a time corresponding to approximately 85% of the period of operation of the buck-boost power converter 200. The modification of T1 assertion times provides hysteresis in the buck-boost power converter 200 to prevent rapid or repeated sequential toggling back and forth between modes of operation. As further shown in the diagram 500, when transitioning from the buck mode of operation to the buck-boost mode of operation, VIN decreases substantially linearly in value and VOUT remains substantially constant in value.

Figure 6:
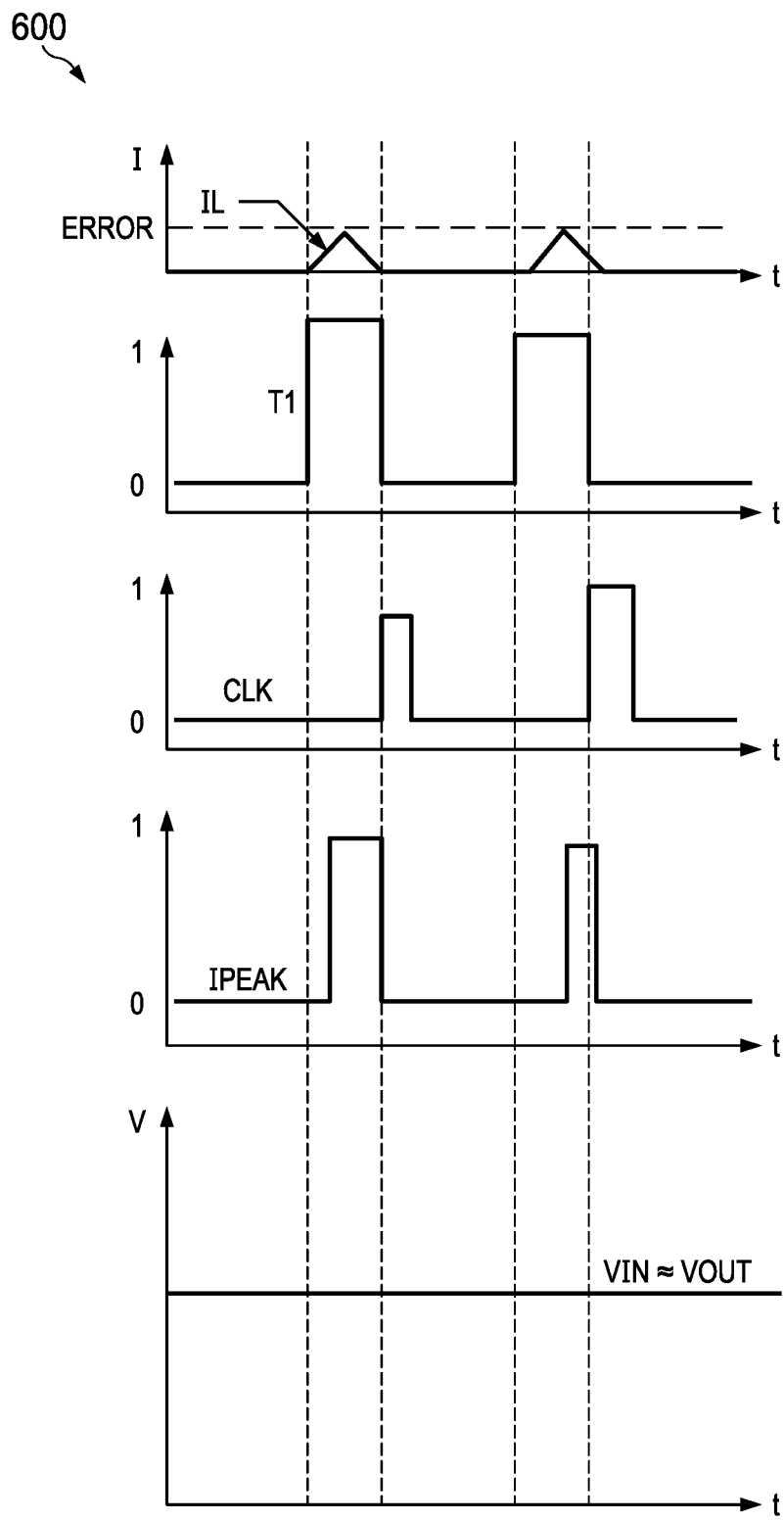
FIG. 6 shows an illustrative diagram of illustrative waveforms in a buck-boost mode of operation of a power converter in accordance with various examples.

Turning now to FIG. 6, a diagram 600 of illustrative waveforms in a buck-boost mode of operation of a power converter is shown. In at least some examples, the diagram 600 is illustrative of at least some signals present in the SMPS 100 of FIG. 1 and/or the buck-boost power converter 200 of FIG. 4. For example, the diagram 600 illustrates signals present in the SMPS 100 of FIG. 1 and/or the buck-boost power converter 200 of FIG. 4 while operating in a buck-boost mode of operation. Accordingly, reference is made to at least some components or signals of FIG. 1 and/or FIG. 4 in describing FIG. 6. Furthermore, the signals illustrated in the diagram 600 are illustrated in an ideal sense, omitting representation of noise and/or signal ripple for the sake of clarity of explanation and ease of understanding.

Diagram 600 illustrates two cycles of operation of the buck-boost power converter 200 when operating in the buck-boost mode of operation. When operating in the buck-boost mode of operation, the buck energize phase begins at a rising edge of CLK. However, because VIN has dropped in value to approximately equal VOUT, as shown in the diagram 600, minimal variation occurs in IL during the buck energize phase. When T1 is asserted and IPEAK is de-asserted, the boost energize phase begins and IL increases in value more rapidly. When IL (or the signal representative of IL) increases in value to reach a value of ERROR, IPEAK is asserted. When IPEAK is asserted the buck de-energize phase begins and IL decreases in value until a next rising edge of CLK occurs. When T1 is asserted and IPEAK is de-asserted, the boost energize phase begins and IL increases in value more rapidly. When IL (or the signal representative of IL) increases in value to reach a value of the error signal, IPEAK is asserted. When IPEAK is asserted the buck de-energize phase begins and IL decreases in value until a next rising edge of CLK occurs. As further shown in FIG. 6, while operating, and being controlled to remain, in the buck-boost mode of operation, IPEAK is asserted prior to T1 being asserted (e.g., a T1 timer expiring). In at least some examples, T1 becomes asserted at a time corresponding approximately to 85% of the period of operation of the buck-boost power converter 200 while operating in the buck-boost mode of operation.

Figure 7:
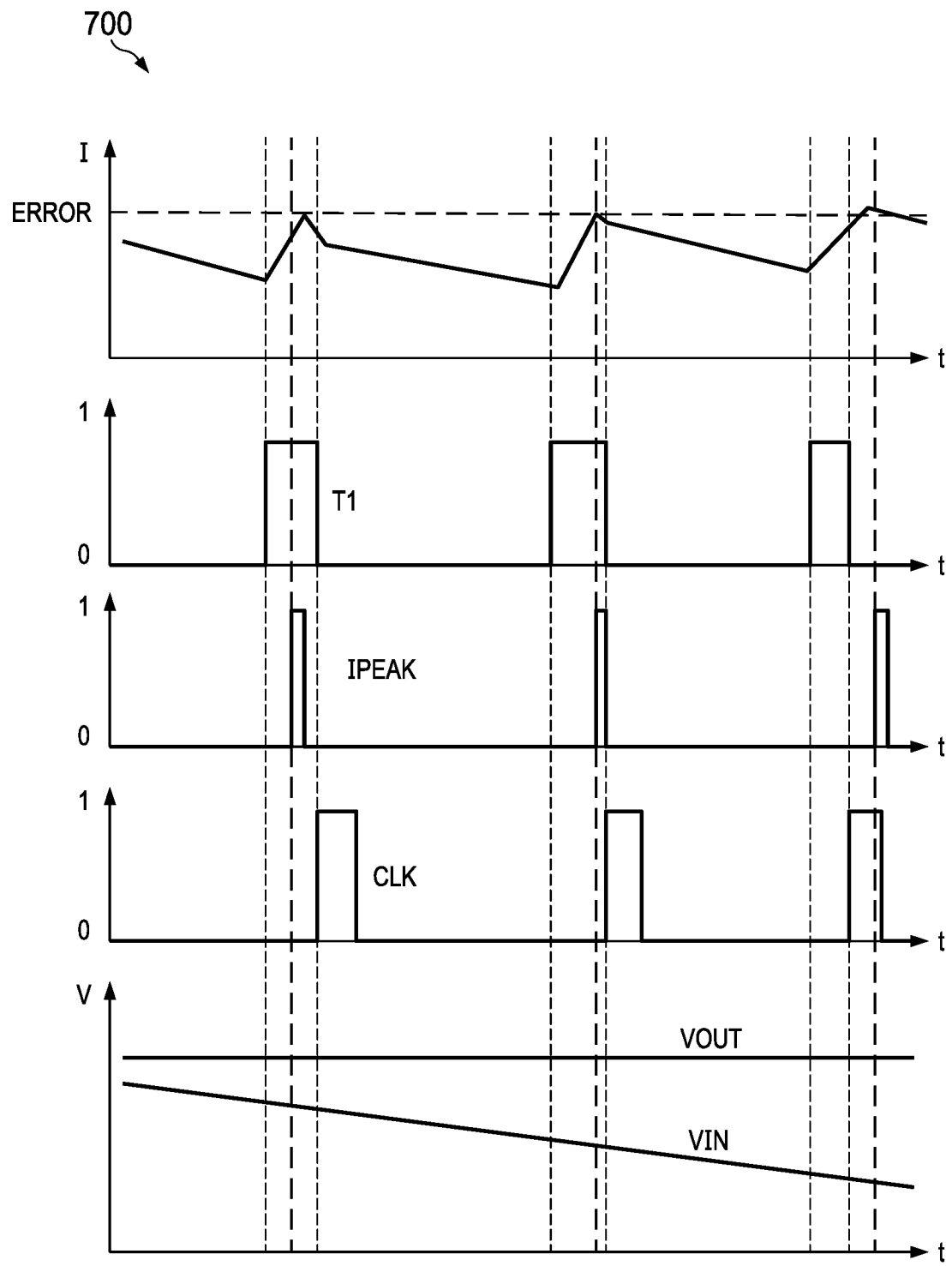
FIG. 7 shows an illustrative diagram of illustrative waveforms in a buck-boost mode of operation of a power converter in accordance with various examples.

Turning now to FIG. 7, a diagram 700 of illustrative waveforms in a buck-boost mode of operation of a power converter is shown. In at least some examples, the diagram 700 is illustrative of at least some signals present in the SMPS 100 of FIG. 1 and/or the buck-boost power converter 200 of FIG. 4. For example, the diagram 500 illustrates signals present in the SMPS 100 of FIG. 1 and/or the buck-boost power converter 200 of FIG. 4 while transitioning from a buck-boost mode of operation to a boost mode of operation. Accordingly, reference is made to at least some components or signals of FIG. 1 and/or FIG. 4 in describing FIG. 7. Furthermore, the signals illustrated in the diagram 700 are illustrated in an ideal sense, omitting representation of noise and/or signal ripple for the sake of clarity of explanation and ease of understanding.

Diagram 700 illustrates three cycles of operation of the buck-boost power converter 200 when transitioning from the buck-boost mode of operation to the boost mode of operation. When T1 is asserted and IPEAK is de-asserted, the boost de-energize phase ends and the boost energize phase begins. The boost energize phase continues until IL increases in value to reach a value of ERROR and IPEAK is asserted. When IPEAK is asserted, the boost energize phase ends and the buck de-energize phase begins. At a rising edge of CLK, the buck de-energize phase ends and the boost de-energize phase begins, continuing until T1 is again asserted. As VIN decreases in value with respect to VOUT, as shown in the diagram 700, a time of assertion of IPEAK drifts with respect to CLK for each cycle of operation of the buck-boost power converter 200. When the time of assertion of IPEAK drifts an amount sufficient to cause IPEAK to not be asserted prior to a rising edge occurring in CLK, the boost energize phase continues until IPEAK is asserted. Subsequently, the buck-boost power converter 200 is controlled to operate in the boost mode of operation. Additionally, when operating in the boost mode of operation T1 again becomes asserted at a time corresponding approximately to 90% of the period of operation of the buck-boost power converter 200. The modification of T1 assertion times provides hysteresis in the buck-boost power converter 200 to prevent rapid or repeated sequential toggling back and forth between modes of operation.

Figure 8:
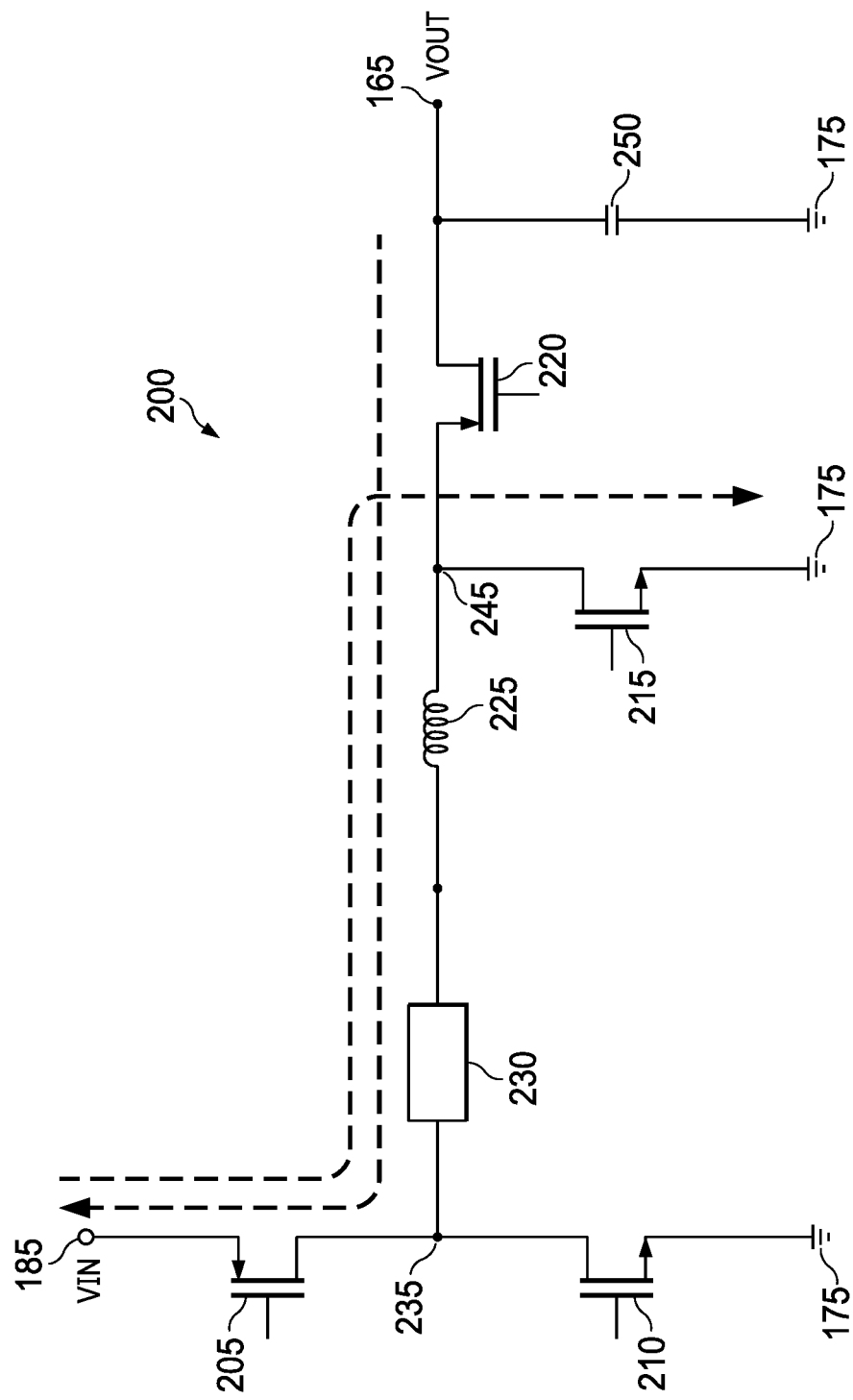
FIG. 8 shows a schematic diagram of an illustrative buck-boost power converter in accordance with various examples.

Turning now to FIG. 8, another schematic diagram of the illustrative buck-boost power converter 200 is shown. FIG. 8 illustrates the buck-boost power converter 200 during the boost mode of operation. To remain operating in the buck-boost mode of operation as discussed above with respect to FIGS. 4-7, IPEAK is asserted prior to a rising edge in CLK. However, when IPEAK is asserted after a rising edge in CLK, the controller controls the power converter 110 to transition from the buck-boost mode of operation to the boost mode of operation. The boost mode of operation includes boost energize and boost de-energize phases. The boost energize and boost de-energize phases are illustrated in FIG. 8 by dashed lines terminating at one end with an arrow that indicates a direction of current flow in the buck-boost power converter 200 during that respective phase of the boost mode of operation.

During the boost energize phase, at each rising edge at which time T1 is asserted, the MOSFETs 205 and 215 are controlled by the controller to be turned on and the MOSFETs 210 and 220 are controlled by the controller to be turned off. In this configuration, current flows from the node 185 to the inductor 225 to charge the inductor until a value of the signal representative of IL reaches a value of the error signal and IPEAK is asserted. When IPEAK is asserted, the MOSFETs 205 and 220 are controlled by the controller to be turned on and the MOSFETs 210 and 215 are controlled by the controller to be turned off. In this configuration, current discharges from the inductor until another rising edge at which time T1 is asserted.

Figure 9:
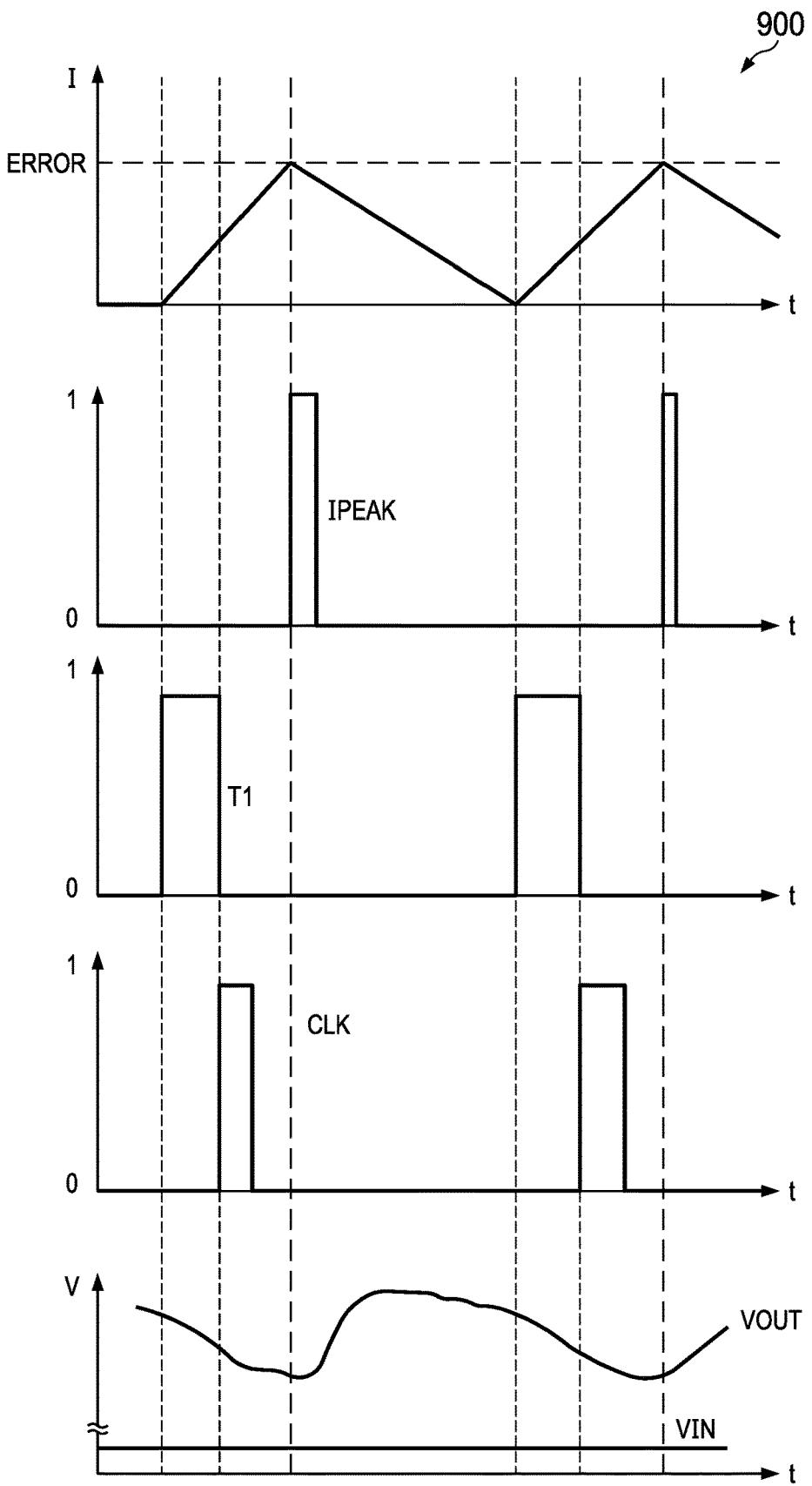
FIG. 9 shows an illustrative diagram of illustrative waveforms in a boost mode of operation of a power converter in accordance with various examples.

Turning now to FIG. 9, a diagram 900 of illustrative waveforms in a boost mode of operation of a power converter is shown. In at least some examples, the diagram 900 is illustrative of at least some signals present in the SMPS 100 of FIG. 1 and/or the buck-boost power converter 200 of FIG. 8. For example, the diagram 900 illustrates signals present in the SMPS 100 of FIG. 1 and/or the buck-boost power converter 200 of FIG. 8 while operating in a boost mode of operation. Accordingly, reference is made to at least some components or signals of FIG. 1 and/or FIG. 8 in describing FIG. 9. Furthermore, the signals illustrated in the diagram 900 are illustrated in an ideal sense, omitting representation of noise and/or signal ripple for the sake of clarity of explanation and ease of understanding.

Diagram 900 illustrates two cycles of operation of the buck-boost power converter 200, beginning with a boost energize phase. When the boost energize phase begins and T1 is asserted, IL begins to increase in value. When IL (or the signal representative of IL) increases in value to reach a value of ERROR, IPEAK is asserted. When IPEAK is asserted, the boost de-energize phase begins and IL decreases in value until T1 is again asserted. While VIN is shown in the diagram 900 as having a substantially stable and constant value less than VOUT, in at least some examples, as VIN increases in value, a duty cycle of the buck-boost power converter 200 (e.g., a duration of the boost energize phase) decreases.

Figure 10:
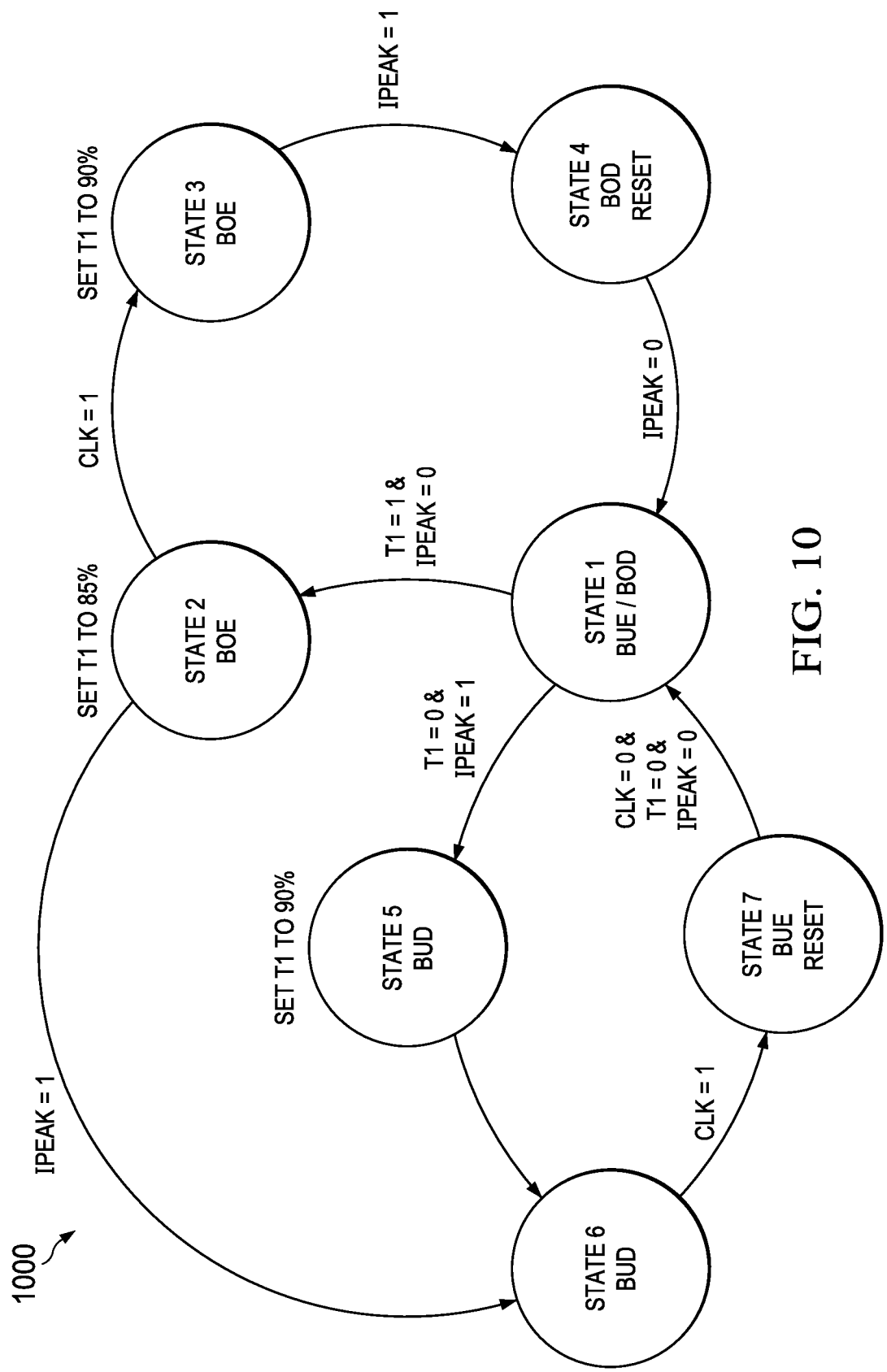
FIG. 10 shows an illustrative state diagram for controlling a power converter in accordance with various examples.

Turning now to FIG. 10, an illustrative state diagram for a state machine 1000 for controlling a power converter is shown. In at least some examples, the state machine 1000 illustrates operations of (and therefore in at least some examples is implemented by) the controller 105 of the SMPS 100 of FIG. 1. In at least some examples, the state machine 1000 indicates rules and/or conditions for controlling a power converter, such as the power converter 110 of the SMPS 100, to operate at a given time in a buck mode of operation, a boost mode of operation, or a buck-boost mode of operation. The state machine 1000 is implemented, in at least some examples, by the circuit 130, as discussed above. In some implementations, the circuit 130 incudes one or more analog and/or digital components to implement the state machine. Additionally, the state machine 1000 may be implemented at least partially according to hardware or software. For example, at least some implementations of the state machine 1000 are implemented by one or more components capable of, and configured to, perform logical operations. The logical operations accept any one or more of CLK, T1, or IPEAK as inputs. Based on a result of those logical operations, one or more control signals, such as discussed above with respect to the circuit 130, are generated and output by the components performing the logical operations. The control signals control a component, such as the gate driver 135 of FIG. 1, to control the power converter to operate in a mode of operation and/or a phase as specified by a state in which the state machine 1000 is operating.

At State 1, the power converter is controlled to operate in either the buck energize phase or the boost de-energize phase (illustrated in FIG. 10 as BOD). When the power converter is operating according to State 1 in the buck energize phase (illustrated in FIG. 10 as BUE), the power converter is controlled to remain in the buck energize phase until T1 is de-asserted and IPEAK is asserted. When operating in the buck energize phase and the controller determines that T1 is de-asserted and IPEAK is asserted, the state machine 1000 transitions to State 5. When the power converter is operating according to State 1 in the boost de-energize phase, the power converter is controlled to remain in the boost de-energize phase until T1 is asserted and IPEAK is de-asserted. When operating in the boost de-energize phase and the controller determines that T1 is asserted and IPEAK is de-asserted, the state machine 1000 transitions to State 2. Further, when operating in State 1, the MOSFET 205 and the MOSFET 220 are controlled to be turned on and the MOSFET 210 and the MOSFET 215 are controlled to be turned off.

At State 2, the power converter is controlled to operate in the boost energize phase (illustrated in FIG. 10 as BOE). While operating in State 2, in at least one example, T1 is set to 85% of the period of operation of the power converter. When the power converter is operating according to State 2, the power converter is controlled to remain in the boost energize phase until a rising edge in CLK occurs or IPEAK is asserted. When the power converter is operating according to State 2 and a rising edge in CLK occurs, the state machine 1000 transitions to State 3. When the power converter is operating according to State 2 and IPEAK is asserted, the state machine 1000 transitions to State 6. Further, when operating in State 2, the MOSFET 205 and the MOSFET 215 are controlled to be turned on and the MOSFET 210 and the MOSFET 220 are controlled to be turned off.

At State 3, the power converter is controlled to continue operating in the boost energize phase. While operating in State 3, in at least one example, T1 is set to 90% of the period of operation of the power converter. When the power converter is operating according to State 3 and IPEAK becomes asserted, the state machine 1000 transitions to State 4. Further, when operating in State 3, the MOSFET 205 and the MOSFET 215 are controlled to be turned on and the MOSFET 210 and the MOSFET 220 are controlled to be turned off.

At State 4, the power converter is controlled to operate in the boost de-energize phase. When the power converter is operating according to State 4, the power converter is controlled to remain in the boost de-energize phase until IPEAK becomes de-asserted. When the power converter is operating according to State 4 and IPEAK becomes de-asserted, the state machine 1000 is reset and transitions to State 1. Further, when operating in State 4, the MOSFET 205 and the MOSFET 220 are controlled to be turned on and the MOSFET 210 and the MOSFET 215 are controlled to be turned off.

At State 5, the power converter is controlled to operate in the buck de-energize phase (illustrated in FIG. 10 as BUD). When the power converter is operating according to State 5, T1 is set to 90% of the period of operation of the power converter and the state machine then transitions to State 6.

At State 6, the power converter is controlled to continue operating in the buck de-energize phase. When the power converter is operating according to State 6, the power converter is controlled to remain in the buck de-energize phase until a rising edge in CLK occurs. When the power converter is operating according to State 6 and a rising edge occurs in CLK, the state machine 1000 transitions to State 7. Further, when operating in State 6, the MOSFET 205 and the MOSFET 220 are controlled to be turned on and the MOSFET 210 and the MOSFET 215 are controlled to be turned off.

At State 7, the power converter is controlled to operate in the buck energize phase. When the power converter is operating according to State 7, the power converter is controlled to remain in the buck energize phase until CLK is de-asserted, T1 is de-asserted, and IPEAK is de-asserted. When the power converter is operating according to State 7, CLK is de-asserted, T1 is de-asserted, and IPEAK is de-asserted, the state machine 1000 is reset and transitions to State 1. Further, when operating in State 7, the MOSFET 205 and the MOSFET 220 are controlled to be turned on and the MOSFET 210 and the MOSFET 215 are controlled to be turned off.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, MOSFET, n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A apparatus comprising:
a peak current detection circuit configured to:
receive an error signal, a feedback signal of a power converter, and a slope compensation signal; and
generate a peak current detection signal according to the error signal, the feedback signal of the power converter, and the slope compensation signal; and
a state machine circuit coupled to the peak current detection circuit, the state machine circuit having a first state and another state, wherein:
in the first state, the state machine circuit is configured to:
generate a control signal for controlling a mode and a phase of operation of the power converter;
receive the peak current detection signal, a clock signal, and a timer signal;
determine that one of the peak current detection signal or the timer signal is asserted and the other of the peak current detection signal or the timer signal is de-asserted; and
transition to the another state of the state machine circuit based on the determination; and
in the another state, the state machine circuit is configured to:
generate the control signal for controlling the mode and the phase of operation of the power converter differently than in the first state.

2. The apparatus of claim 1, wherein the state machine circuit further having a plurality of states that includes the first state and the another state, wherein each state of the state machine circuit corresponds to at least one of a buck energize phase of operation, a buck de-energize phase of operation, a boost energize phase of operation, or a boost de-energize phase of operation, and wherein each of the enumerated phases of operation corresponds to at least two states of the state machine circuit.

3. The apparatus of claim 2, wherein the plurality of states include the first state, a second state implemented as the another state, a third state, a fourth state, a fifth state, a sixth state, and a seventh state, and wherein the first state corresponds to the buck energize phase of operation or the boost de-energize phase of operation, the second state corresponds to the boost energize phase of operation, the third state corresponds to the boost energize phase of operation, the fourth state corresponds to the boost de-energize phase of operation, the fifth state corresponds to the buck de-energize phase of operation, the sixth state corresponds to the buck de-energize phase of operation, and the seventh state corresponds to the buck energize phase of operation.

4. The apparatus of claim 2, wherein the plurality of states include the first state, a second state, a third state, a fourth state, a fifth state implemented as the another state, a sixth state, and a seventh state, and wherein the first state corresponds to the buck energize phase of operation or the boost de-energize phase of operation, the second state corresponds to the boost energize phase of operation, the third state corresponds to the boost energize phase of operation, the fourth state corresponds to the boost de-energize phase of operation, the fifth state corresponds to the buck de-energize phase of operation, the sixth state corresponds to the buck de-energize phase of operation, and the seventh state corresponds to the buck energize phase of operation.

5. The apparatus of claim 1, wherein in the first state the state machine circuit is further configured to transition to a second state implemented as the another state responsive to the timer signal being asserted and the peak current detection signal is being de-asserted, and in the second state, the state machine circuit is configured to transition back to the first state via at least one additional state.

6. The apparatus of claim 5, wherein in the second state the state machine circuit is further configured to transition to a third state when the clock signal becomes asserted and after setting a period of the timer signal to a first value, and in the third state the state machine circuit is configured to transition to a fourth state responsive to the peak current detection signal being asserted and after setting the period of the timer signal to a second value, and in the fourth state the state machine circuit is configured to transition to the first state responsive to the peak current detection signal being de-asserted.

7. The apparatus of claim 5, wherein in the second state the state machine circuit is further configured to transition to a sixth state responsive the peak current detection signal being asserted, in the sixth state the state machine circuit is configured to transition to a seventh state responsive to the clock signal being asserted, and in the seventh state the state machine circuit is configured to transition to the first state responsive to the peak current detection signal being de-asserted, the clock signal being de-asserted, and the timer signal being de-asserted.

8. The apparatus of claim 1, wherein in the first state the state machine circuit is further configured to transition to a fifth state implemented as the another state responsive to the timer signal being de-asserted and the peak current detection signal being asserted, and in the fifth state the state machine circuit is configured to transition back to the first state from the fifth state via at least one additional state.

9. The apparatus of claim 8, wherein in the fifth state the state machine circuit is further configured to transition to a sixth state after setting a period of the timer signal to a first value, in the sixth state the state machine circuit is configured to transition to a seventh state responsive to the clock signal being asserted, and in the seventh state the state machine circuit is configured to transition to the first state responsive to the peak current detection signal being de-asserted, the clock signal being de-asserted, and the timer signal being de-asserted.

10. An apparatus comprising:
a power converter controller, including:
a peak current detection circuit having first and second input terminals and an output terminal, the peak current detection circuit configured to:
receive, at the first input terminal, a signal representative of a current of a power converter, and receive an error signal at the second input terminal;
compare the signal representative of the current of the power converter to an error signal; and
generate a peak current detection signal at its output terminal, the peak current detection signal having an asserted value responsive to comparing the signal representative of the current of the power converter to the error signal; and
a state machine circuit coupled having respective first, second, and third input terminals and respective output terminals, its first input terminal coupled to the output terminal of the peak current detection circuit, the state machine circuit configured to:
receive the peak current detection signal at its first input terminal, a clock signal at its second input terminal, and a timer signal at its third input terminal; and
generate control signals at its output terminals, the control signals for controlling a mode and a phase of operation of the power converter based on values of the peak current detection signal, the clock signal, and the timer signal.

11. The apparatus of claim 10, wherein the power converter controller further comprises:
a feedback circuit having a respective input terminal and a respective output terminal, its output terminal coupled to the second input terminal of the peak current detection circuit, the feedback circuit configured to:
receive an output voltage of the power converter, at its input terminal;
generate a feedback signal; and
generate the error signal based on a difference between the feedback signal and a reference signal;
a slope compensation circuit coupled to the peak current detection circuit and configured to generate a slope compensation signal, wherein at least one of the error signal or the signal representative of the current of the power converter is modified according to the slope compensation signal prior to the comparison; and
an oscillator coupled to the state machine circuit and configured to generate and output the clock signal and the timer signal.

12. The apparatus of claim 10, further comprising a gate driver having respective input terminals coupled to the output terminals of the state machine circuit, and the gate driver configured to:
receive the control signals from the state machine circuit; and
generate gate control signals for controlling respective gate terminals of transistors of the power converter, wherein each received control signal uniquely corresponds to a generate gate control signal.

13. The apparatus of claim 12, further comprising the power converter including the transistors.

14. The apparatus of claim 10, wherein the state machine circuit is configured to:
generate the control signals, according to a first state of a state machine circuit, for controlling the mode and the phase of operation of the power converter;
monitor at least some of the peak current detection signal, the clock signal, and the timer signal to determine when at least one of the peak current detection signal, the clock signal, or the timer signal changes in value;
transition to another state of the state machine circuit at least partially according to the change in value of the peak current detection signal, the clock signal, or the timer signal; and
generate the control signals, according to the another state of the state machine circuit, for controlling the mode and the phase of operation of the power converter.

15. The apparatus of claim 14, wherein the state machine circuit has states, the states including at least the first state and the another state, wherein each state of the state machine circuit corresponds to at least one of a buck energize phase of operation, a buck de-energize phase of operation, a boost energize phase of operation, or a boost de-energize phase of operation, and each of the enumerated phases of operation corresponds to at least two states of the state machine circuit.

16. The apparatus of claim 15, wherein the states include the first state, a second state, a third state, a fourth state, a fifth state, a sixth state, and a seventh state, and the first state corresponds to the buck energize phase of operation or the boost de-energize phase of operation, the second state corresponds to the boost energize phase of operation, the third state corresponds to the boost energize phase of operation, the fourth state corresponds to the boost de-energize phase of operation, the fifth state corresponds to the buck de-energize phase of operation, the sixth state corresponds to the buck de-energize phase of operation, and the seventh state corresponds to the buck energize phase of operation.

17. A system, comprising:
a switched mode power supply (SMPS) comprising:
a power converter including transistors, each transistor having a respective gate terminal; and a SMPS controller comprising:
  a feedback circuit having input and output terminals, its input terminal coupled to the power converter;
  a peak current detection circuit having first and second input terminals and a respective output terminal, the first input terminal coupled to the power converter, and the second input terminal coupled to the output terminal of the feedback circuit;
  a state machine circuit having a respective input terminal and respective output terminals, its input terminal coupled to the output terminal of the peak current detection circuit, the state machine circuit configured to:
    receive a peak current detection signal, a clock signal, and a timer signal; and
    generate control signals at its output terminals for controlling a mode and a phase of operation of the power converter based on values of the peak current detection signal, the clock signal, and the timer signal; and
  a gate driver having respective input terminals and output terminals, its input terminals coupled to the output terminals of the state machine circuit and its output terminals coupled to the gate terminals of the transistors.

18. The system of claim 17, wherein the feedback circuit is configured to:
  receive an output voltage of the power converter;
  generate a feedback signal; and
  generate an error signal based on a difference between the feedback signal and a reference signal,
  wherein the peak current detection circuit is configured to:
    receive a signal representative of a current of the power converter;
    compare the signal representative of the current of the power converter to the error signal; and
    generate the peak current detection signal having an asserted value responsive to comparing the signal representative of the current of the power converter to the error signal, and
  wherein the gate driver is configured to:
    receive the control signals from the state machine circuit; and
    generate gate control signals corresponding to the control signals, wherein the transistors are controlled by the gate control signals to implement the mode and the phase of operation of the power converter, wherein a number of output terminals of the state machine circuit, a number of input terminals of the gate driver, and a number of output terminals of the gate driver each corresponds to a number of the transistors, and wherein each output terminal of the gate driver uniquely couples to the gate terminal of one of the transistors of the power converter.

19. The system of claim 18, wherein the SMPS controller further comprises:
  a slope compensation circuit coupled to the peak current detection circuit and configured to generate a slope compensation signal, wherein at least one of the error signal or the signal representative of the current of the power converter is modified according to the slope compensation signal prior to the comparison; and
  an oscillator coupled to the state machine circuit and configured to generate and output the clock signal, and the timer signal.

20. The system of claim 17, wherein the state machine circuit is further configured to:
  generate the control signals, according to a first state of the state machine circuit, for controlling the mode and the phase of operation of the power converter;
  monitor at least some of the peak current detection signal, the clock signal, and the timer signal to determine when at least one of the peak current detection signal, the clock signal, or the timer signal changes in value;
  transition to another state of the state machine circuit at least partially according to the change in value of the peak current detection signal, the clock signal, or the timer signal; and
  generate the control signals, according to the another state of the state machine circuit, for controlling the mode and the phase of operation of the power converter.

21. The system of claim 20, wherein the state machine circuit has a plurality of states including at least the first state and the another state, wherein each state of the state machine circuit corresponds to at least one of a buck energize phase of operation, a buck de-energize phase of operation, a boost energize phase of operation, or a boost de-energize phase of operation, and wherein each of the enumerated phases of operation corresponds to at least two states of the state machine circuit.

* * * * *